United States Patent [19]

Fleek et al.

[11] Patent Number: 5,533,025
[45] Date of Patent: Jul. 2, 1996

[54] ROBUST FREQUENCY MANAGEMENT AND ACQUISITION IN A WIRELESS LOCAL AREA NETWORK THAT USES FREQUENCY-HOPPING RADIOS

[75] Inventors: Arthur E. Fleek, Cary, N.C.; Richard O. LaMaire, Yorktown Heights, N.Y.

[73] Assignee: International Business Machines Corporation, Armonk, N.Y.

[21] Appl. No.: 313,516

[22] Filed: Sep. 26, 1994

[51] Int. Cl.$^6$ ........................................ H04J 3/02
[52] U.S. Cl. .................. 370/85.2; 375/202; 370/69.1; 370/100.1
[58] Field of Search .................. 370/85.2, 85.7, 370/85.3, 94.1, 69.1, 100.1; 375/200, 202, 205

[56] References Cited

U.S. PATENT DOCUMENTS

| 5,193,102 | 3/1993 | Meidan et al. | 375/202 |
| 5,287,384 | 2/1994 | Avery et al. | 375/202 |
| 5,386,435 | 1/1995 | Cooper et al. | 375/202 |
| 5,394,433 | 2/1995 | Bantz et al. | 375/202 |

*Primary Examiner*—Douglas W. Olms
*Assistant Examiner*—Shick Hom
*Attorney, Agent, or Firm*—Douglas W. Cameron

[57] ABSTRACT

A method for use in a single cell of a wireless communication system of the type having a leader station that coordinates communication among a plurality of remote stations that are in the cell. The method applies to systems that use slow frequency-hopping radios and a Carrier Sense Multiple Access (CSMA) type protocol. In this context, the method allows a remote station to initially acquire the frequency-hopping pattern and time base of the leader station and to maintain frequency synchronization in the face of control information loss due to radio transmission effects (e.g., interference, noise or multipath fading). In the acquisition phase, the remote station actively generates probe messages that are sent to the leader station so as to rapidly achieve frequency synchronization with the leader station.

3 Claims, 8 Drawing Sheets

ROBUST FREQUENCY MANAGEMENT AND ACQUISITION IN A WIRELESS LOCAL AREA NETWORK THAT USES FREQUENCY-HOPPING RADIOS

TECHNICAL FIELD

The present invention relates to Radio Frequency (RF) wireless communication systems, and more particularly to the establishment and reliable maintenance of the synchronization in a frequency-hopping communication system that is subject to radio transmission errors.

BACKGROUND OF THE INVENTION

Frequency hopping is a radio communication technique in which information is transmitted using a sequence of carrier frequencies that change at various times (i.e., hop) in center frequency over the available spectrum. Of primary interest for the subject invention is the technique of slow frequency hopping in which the hop rate is much less than the information symbol rate and thus many symbols are sent on the same carrier frequency during each hop, maintaining narrowband transmission conditions within each hop.

In a single or multicellular wireless communication network, each cell has a single leader station that coordinates communication among the remote stations that are within its cell. Specifically, the leader station provides, either implicitly or explicitly, the control and timing information that is required for the remote stations to remain in frequency-hopping synchronization with the leader station. In a single cell of such a wireless communication network, multiple remote stations need to access the shared radio channel. In many wireless Local Area Networks (LAN), a Carrier Sense Multiple Access (CSMA) type protocol is used, in part, because of its low access delays under low and moderate traffic loads. None of the prior art on synchronization in frequency-hopping systems that use CSMA type protocols deals with the problem of achieving fast frequency acquisition and of maintaining Frequency-hopping synchronization in an environment that is subject to radio transmission errors (e.g., due to interference or fading).

The following references are typical of the background art in the field of synchronization techniques in Frequency-hopping systems.

U.S. Pat. No. 5,287,384 issued Feb. 15, 1994 to Avery et al. entitled "Frequency Hopping Spread Spectrum Data Communications System" discloses a frequency-hopping communication system in which a time-slotted Medium Access Control (MAC) protocol is used and provisions for low-power operation modes are made. To achieve initial frequency synchronization, the remote stations listen for a time mark frame that is generated periodically by the base station.

U.S. Pat. No. 5,130,987 issued Jul. 14, 1992 to Flammer entitled "Method for Synchronizing a Wide Area Network without Global Synchronizing" discloses a frequency-hopping packet communication system that does not use a master clock or master control unit, but instead makes use of a receiver's frequency-hopping timing and identification to control communication. In this scheme, each receiving station establishes a table of receiver frequency-hopping sequence offsets of each other station within its communication range, and each station announces its presence on each frequency in a packet with a hop timing offset indicator.

U.S. Pat. No. 4,872,182 issued Oct. 3, 1989 to McRae et al. entitled "Frequency Management System for Use in Multistation H. F. Communication System" discloses a system for managing frequencies in a frequency-hopping communication system. Any station desiring to communicate with another station of the network, repeatedly transmits, on each of the K communication frequencies in sequence, a probe message comprised of three successive symbols. Each station that is in an idle mode monitors the level of activity of each of the K communication frequencies by successively dwelling on each frequency for the length of time required for any message-transmitting station to step through all K frequencies in the network.

U.S. Pat. No. 4,850,036 issued Jul. 18, 1989 to Smith entitled "Radio Communication System Using Synchronous Frequency Hopping Transmissions" discloses a frequency-hopping synchronization scheme in which a special start-up sequence with a special control frequency is used by the master station to communicate the frequency-hopping sequence that will be used.

U.S. Pat. No. 4,677,617 issued Jun. 30, 1987 to O'Connor et al. entitled "Rapid Frequency-Hopping Time Synchronization" discloses a method for synchronizing the operation of frequency-hopping communication devices. In this method, a special control station (i.e., the network device) transmits sequences of synchronization messages at a transmit hop rate that is substantially higher than the receive hop rate so that all possible receive frequencies and synchronization codes are bracketed by the transmission sequence. During the acquisition phase (called the idle state in the patent), a remote station hops through a discrete set of receive frequencies for a dwell time that is determined by the hop rate. In this way, the two stations can achieve rapid synchronization.

U.S. Pat. No. 4,558,453 issued Dec. 10, 1985 to Mimken entitled "Synchronization Method and Frequency Hopping Communication System" discloses a method for synchronizing two frequency-hopping radios. In this method, a transmitter automatically initiates the transmission of a predetermined number of cycles of a synchronization signal at each of a number of different frequencies. The receiver is being tuned through the same frequencies at a relatively slower rate so that the synchronization signal is received at each of the receiver frequencies.

A patent application filed on Oct. 22, 1993, serial number 8-142555, by Bauchot et al. entitled "Radio Communications with Fault Tolerant Frequency Hopping Synchronization" discloses a method for acquiring and maintaining frequency-hopping synchronism in the presence of radio transmission errors. The latter patent is hereby incorporated herein by reference. To achieve initial frequency synchronization, a remote station listens for control information that is broadcast by the base station.

Therefore, there is a need for a frequency-hopping communication system that uses a CSMA protocol and provides methods of achieving fast frequency acquisition and of maintaining frequency-hopping synchronization in an environment that is subject to radio transmission errors.

SUMMARY OF THE INVENTION

In accordance with the object of the present invention, methods and structures are provided for rapidly initiating and reliably continuing radio communications among a group of stations. The invention applies to slow frequency-hopping systems in which a Carrier Sense Multiple Access (CSMA) type protocol is used.

An architecture in which a group of remote stations is coordinated by a single leader station is considered. In this context, the present invention allows a remote station to achieve fast frequency acquisition with the leader station and to maintain frequency synchronization in the face of control information loss due to radio transmission effects (e.g., interference, noise or multipath fading).

It is another object of this invention to increase aggregate throughput by allowing for variable hop cycle lengths in which packet transmission overrun is allowed.

Accordingly, in a wireless network using frequency-hopping radio communications and a CSMA protocol, this invention provides a method and apparatus for a remote station to achieve frequency-hopping synchronization with a leader station with which it was previously unsynchronized. With this invention, each remote station senses a first frequency using a carrier sense protocol. If the carrier signal of the first frequency is sensed, a request message is transmitted on the first frequency to the leader station after an appropriate delay that is determined by using the carrier sense protocol. The request message indicates a request to establish communication with a leader station. On the other hand, if the carrier signal of the first frequency is not sensed, the request message can be transmitted without delay. When a remote station receives a response to the request message from the leader station, the station then listens on the first frequency for a hop cycle trailer signal. Upon seeing the signal, the station will hop to a second frequency indicated in the trailer signal at a time which is also indicated in the trailer signal. This second frequency is the frequency at which the stations communicate with each other. If, however, a remote station does not receive a response by a certain time, it hops to a third frequency that is randomly chosen and the process (as described above in this paragraph) repeats itself with the remote station sensing the third frequency instead of the first frequency.

Accordingly, this invention also provides a method and apparatus for determining when to hop to a frequency at which remote stations in a wireless network communicate with each other. With this other aspect of the invention, the initiation of packet transmission by each of the remote stations of the network and by a leader station is disabled after a selected minimum time following the start of a hop cycle, which is the period of time during which a station remains on a given frequency. Also, if after the selected minimum time, a current carrier frequency is not sensed by the leader station, then a hop cycle trailer signal is broadcasted from the leader station to indicate to which frequency the stations are to hop so as to communicate with each other. On the other hand, if after the selected minimum time the current carrier frequency is still sensed by the leader station, then the hop cycle trailer signal will usually be broadcast when the current carrier frequency is no longer sensed. However, if after a maximum time following the start of the hop cycle, the current carrier frequency is still sensed by the leader, then the hop cycle trailer signal is transmitted after this maximum time has elapsed. This maximum time is the minimum time plus the maximum packet transmission time. When the stations receive the broadcasted hop cycle trailer signal, they will then hop to the second frequency at which they will then communicate with each other. Other variations of this invention provide for having a different minimum time for each remote station and for reducing the minimum time when hop cycle trailers are not received. This allows remote stations to maintain coarse time synchronization with the leader station in the face of loss of control information.

DESCRIPTION OF THE PREFERRED EMBODIMENT

Figure 1:
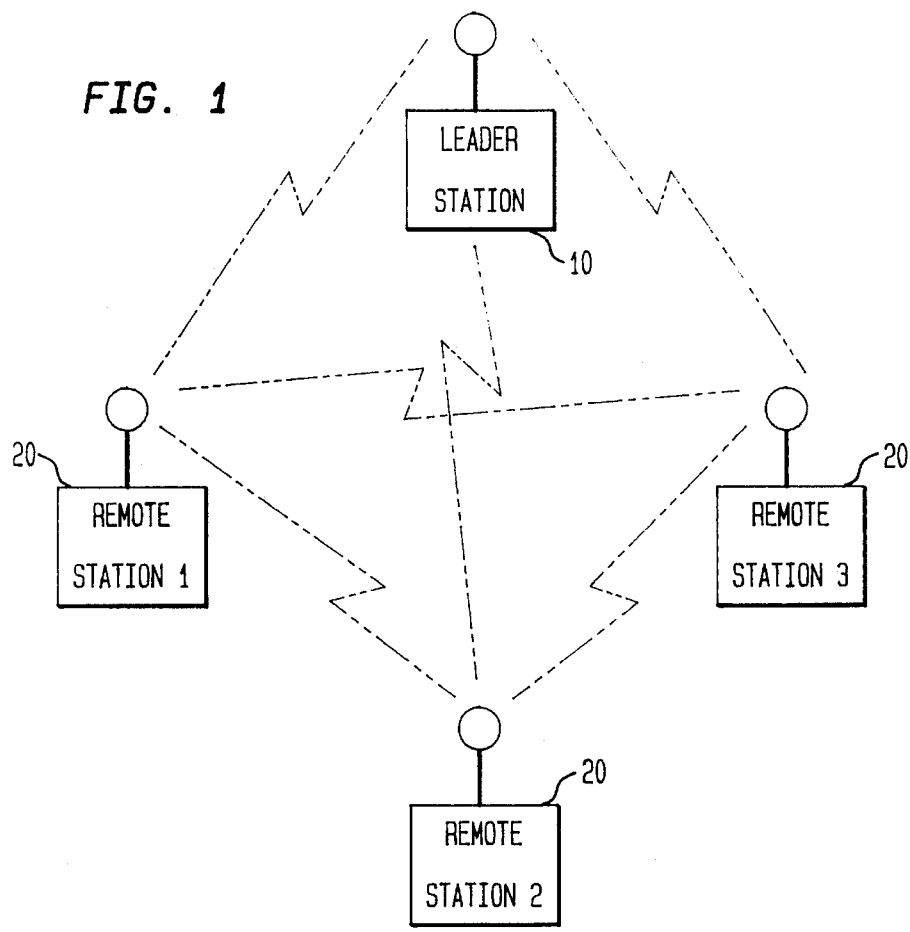
FIG. 1 shows the wireless network architecture to which the invention applies.

With reference to FIG. 1, consider a wireless network architecture in which a group of one or more remote stations 20 communicate with each other and with the leader station 10. The leader station 10 coordinates the communication among the remote stations and between these remote stations and itself by broadcasting the control and timing information that is required by the remote stations to maintain frequency synchronization with the leader station and hence with one another. The general architecture of FIG. 1 can describe a single cell of a cellular type network architecture in which a multiplicity of access points (or base stations) are connected to a wired backbone network and provide access to remote stations as they move through the various areas that are within range of each access point. In this case, the leader station 10 would serve the frequency-hopping control functions described above and would also provide a bridging or routing function to the wired backbone network. In a second scenario that is also captured by FIG. 1, an isolated group of remote stations could communicate in an ad hoc mode by electing one remote station to become a leader station so that it could coordinate frequency-hopping patterns for the group.

Figure 2:
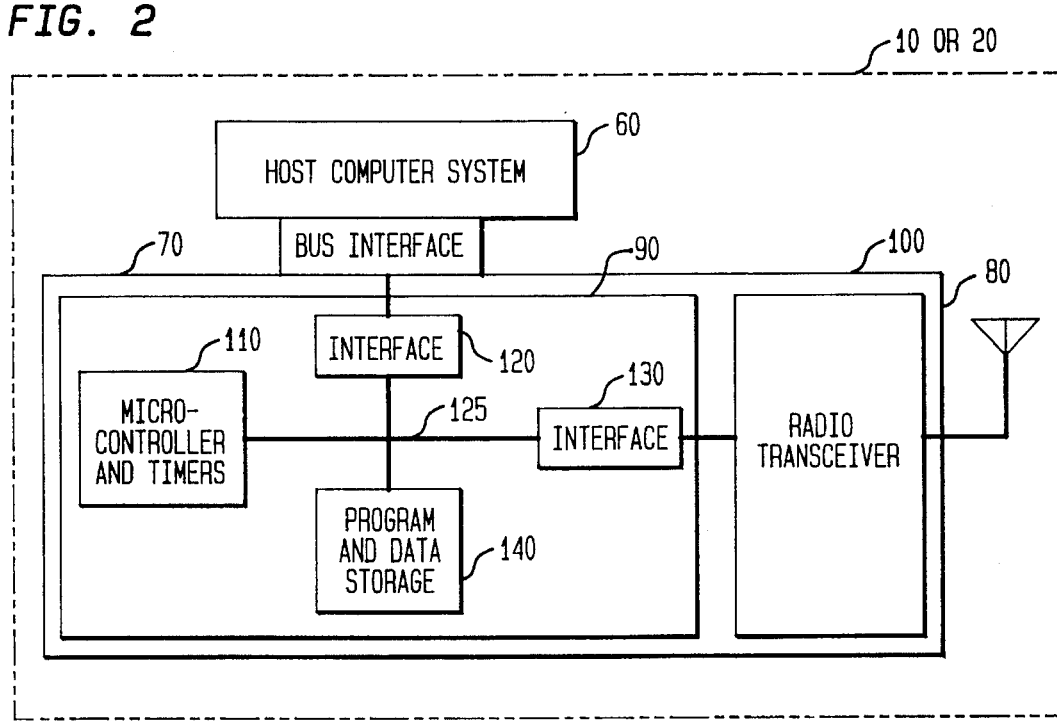
FIG. 2 is a block diagram of a wireless station.

FIG. 2 shows the system block diagram illustrating the structure of both the leader and remote stations. The radio communication adapter 80 is connected to the host computer 60 through a bus interface 70. The radio communication adapter 80 is itself composed of a radio transceiver 100 with carrier sensing capability and an adapter control system 90 that controls the radio transceiver 100 through an interface bus 130. The adapter control system 90 is composed of a microcontroller (or microprocessor) and timers 110 along with a storage area 140 for the microcontroller software program and data. Further, the adapter control system 90 includes a system interface 120 which interfaces the adapter control system to the host computer 60 through the bus interface 70. The components, 110, 120, 130, and 140, of the adapter control system 90 are interconnected by an internal bus 125. All of the mechanisms that will be described in the following flowcharts of FIGS. 3, 5, and 8–10 can be implemented in software that runs on the microcontroller 110 and is stored in 140. Alternatively, those skilled in the art will recognize that the mechanisms of these flowcharts could also be implemented directly in specialized hardware (i.e., in the form of an application-specific integrated circuit).

Most Radio Frequency (RF) wireless Local Area Networks (LAN) operate in frequency bands in which spread-spectrum operation is required (by the Federal Communications Commission). In the preferred embodiment, we consider the specific spread-spectrum approach of using slow frequency hopping. Further, in the preferred embodiment, we choose to use a Carrier Sense Multiple Access (CSMA) type of Medium Access Control (MAC) protocol. Specifically, we use a version of CSMA that has Collision Avoidance (CA). We will refer to this protocol by the term CSMA/CA.

Figure 3:
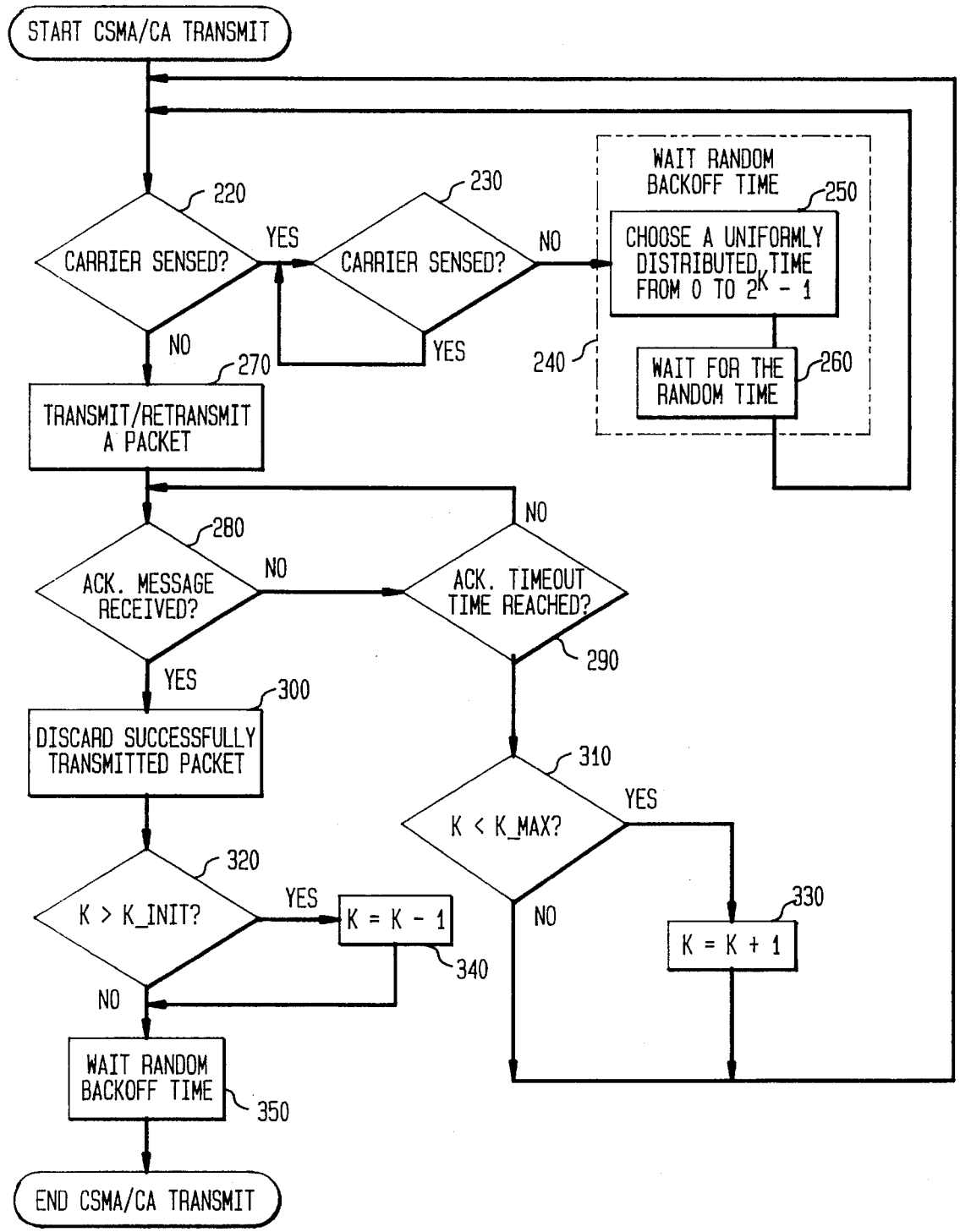
FIG. 3 is a flowchart illustrating the operation of an example CSMA/CA protocol.

As background, we briefly describe a specific example of the CSMA/CA protocol that was used in the preferred embodiment, but those skilled in the art will recognize that many varieties of CSMA type protocols could alternatively be used. The key element that is used here is only the carrier-sensing aspect of the protocol. A flowchart illustrating the operation of the CSMA/CA protocol is shown in FIG. 3. In this discussion, it is assumed that both the receiver and transmitter are using the same frequency. We assume that at least one packet is waiting in a transmit queue of the station before we begin the operations in FIG. 3. This transmit queue is typically implemented in the data storage area 140 of the radio communication adapter 80. Initially, the protocol parameter K that is used in FIG. 3 is assumed to be set to a chosen value K_INIT. A typical value of K_INIT is 4 or 8. As will later be seen, the parameter K affects the length of random time delay that is used in the backoff part of the protocol. When a station (i.e., either a leader or remote station) has a packet that is ready for transmission, it senses the radio channel to determine if carrier is present as indicated by 220. If a carrier is present, then the remote station waits until the radio channel becomes idle at 230 and then waits (i.e., backoffs) a random amount of time in block 240 and begins the entire sensing and transmit procedure all over again. Many different procedures have been proposed for determining how long the random backoff time should be. In our example, we use a truncated binary exponential backoff mechanism. That is to say, the backoff time is chosen as a uniformly distributed random integer R (representing units of time) in the range $$0 \leq R \leq 2^K - 1$$

as shown in block 250.

If no carrier is sensed at 220, the ready packet at the head of the transmit queue is transmitted in block 270. This may be the first time that the packet is transmitted or it may be a retransmission of the packet. After a packet has been transmitted in block 270, the station waits for an acknowledgment message to be sent back by the destination station of the original data packet as shown in 280. If after a chosen acknowledgment timeout has been reached, no acknowledgment message has been received as shown in 290, then the parameter K is incremented in block 330 if K is less than the maximum allowable value of K 310, which we label K_KMAX. A typical value of K_MAX is 10. Further, since no acknowledgment message has been received the flowchart returns to the top and begins the entire transmit procedure again so that the presumably lost packet can be retransmitted. If an acknowledgment message is received at 280, that is, before the acknowledgment timeout occurs, then the successfully transmitted packet can be discarded from the transmit queue at block 300. Following this, the value of K is decremented in block 340 if it is not already as small as K_INIT as checked by 320. Finally, in block 350, a random backoff time is waited (as given in detail by block 240) so that the same station will not transmit back to back packets and monopolize the channel.

Figure 4:
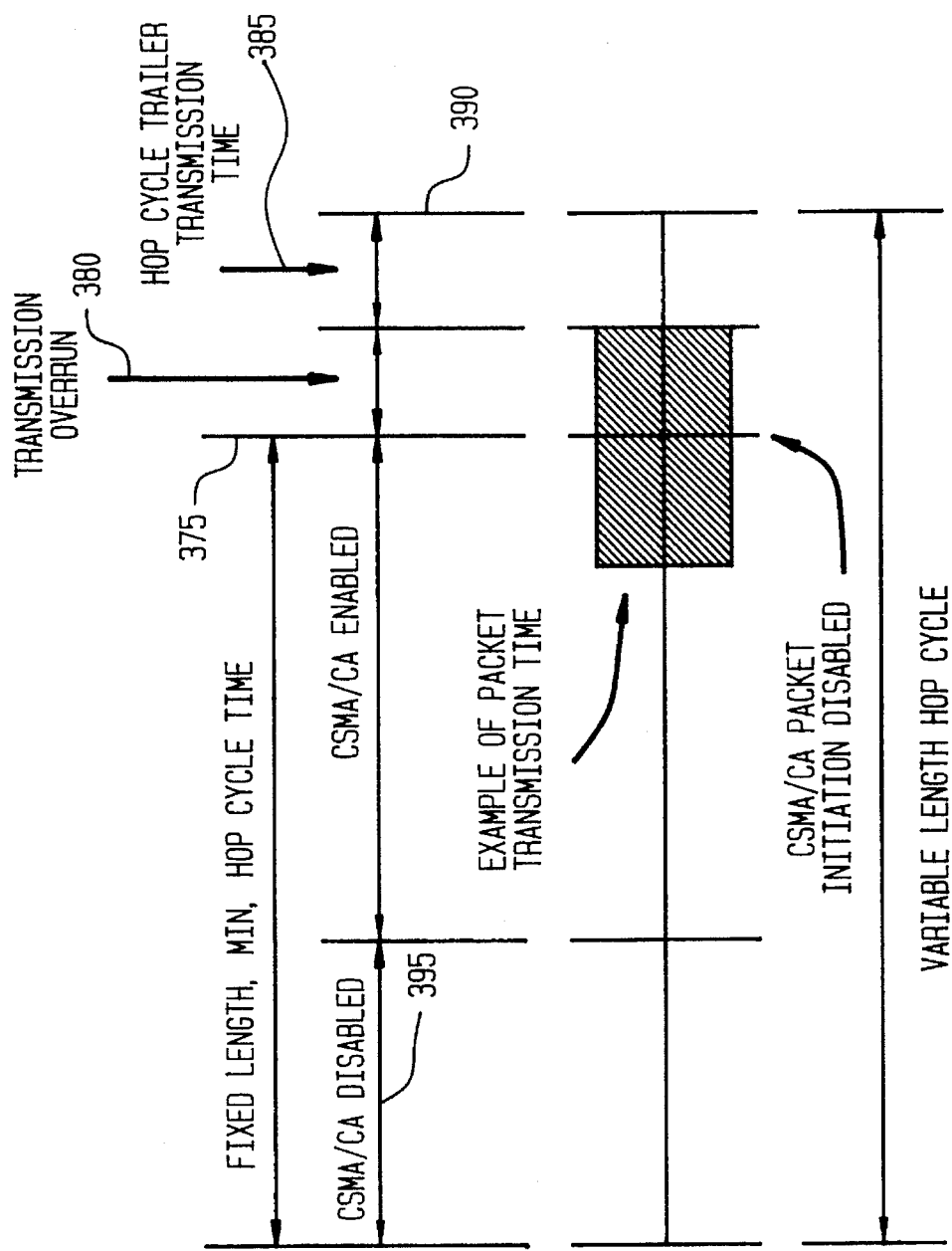
FIG. 4 is a timing diagram for a typical hop cycle.

In FIG. 4, we show a timing diagram for one hop cycle. We define a hop cycle to be the period of time during which a station, be it a leader or remote, remains on a given frequency being either in the receive or transmit mode. The radio transceiver of a station hops to the next frequency immediately after the end of a hop cycle. We assume the generality of allowing variable-length hop cycles so as to increase the aggregate throughput of the wireless communication system. That is, if fixed-length hop cycles are used, then a packet whose transmission time would extend beyond the end of the hop cycle would have to forego transmitting and some time would be wasted at the end of the hop cycle. In the preferred embodiment, we allow variable-length hop cycles by permitting a station to begin transmission right up to some fixed time, which we label the MINIMUM HOP CYCLE TIME. As shown in FIG. 4, after the MINIMUM HOP CYCLE TIME 375, the initiation of packet transmission is prohibited, however, the completion of already initiated packets is permitted. This means that following the MINIMUM HOP CYCLE TIME, there will be a period of time 380 with a length between 0 and TMAX time units during which packet transmission overrun occurs, where TMAX is the time that it takes to transmit the longest packet that is permitted in the wireless communication system, i.e., the maximum length packet. As shown in FIG. 4, the period of packet transmission overrun is followed by a period of time 385 during which the hop cycle trailer is transmitted by the leader station. This hop cycle trailer provides the information that the remote stations need to determine what frequency to hop to next after the current hop cycle ends 390. As an option, the CSMA/CA transmission protocol can be disabled during the initial period of the hop cycle 395 to allow for dedicated transmission (e.g., by the leader station) as is shown in FIG. 4.

Figure 5:
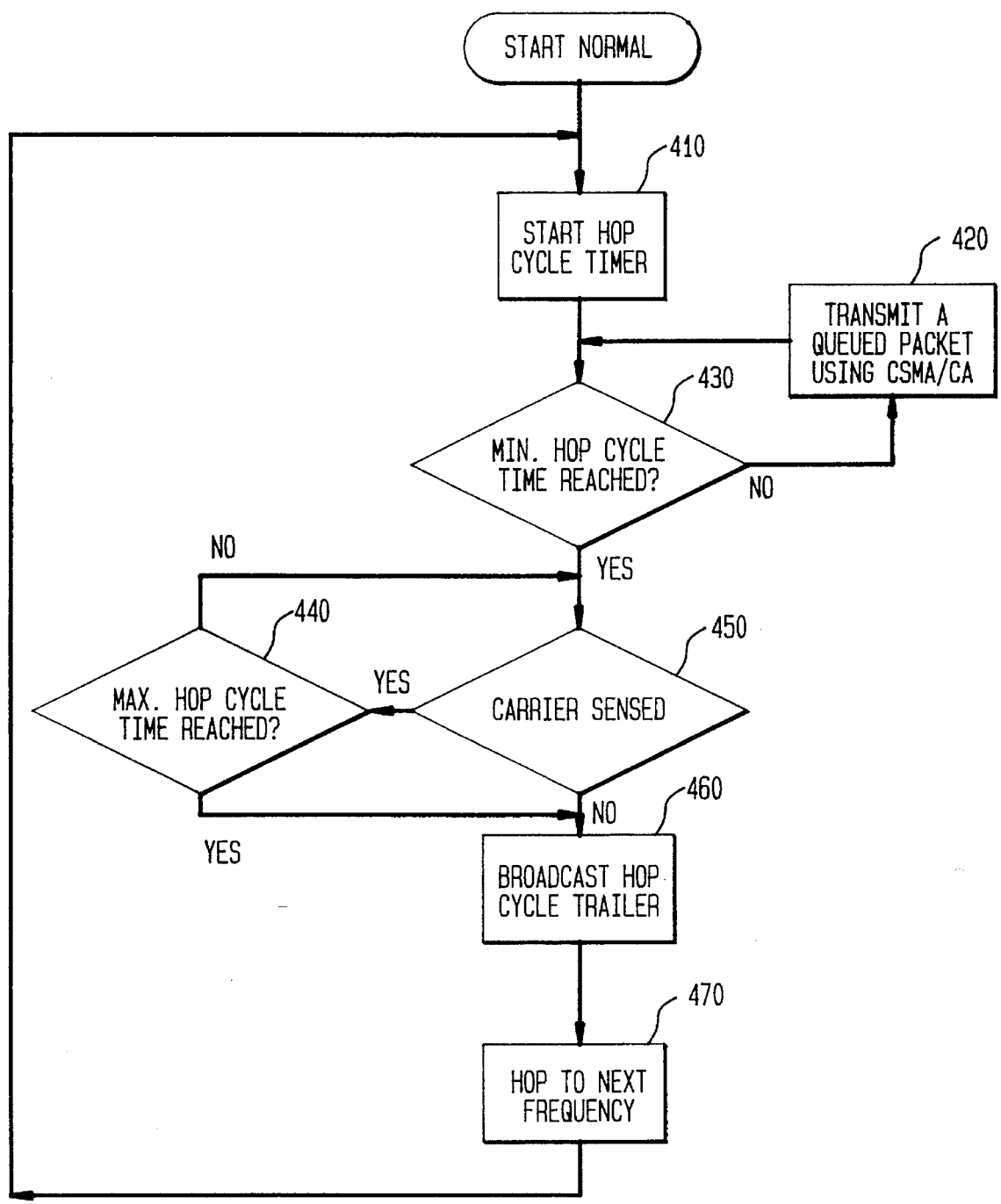
FIG. 5 is a flowchart illustrating the operation of a leader station.

FIG. 5 shows the detailed operation of the leader station. At the beginning of the hop cycle, the hop cycle timer is started in block 410. The leader station is permitted to initiate data packet transmissions in block 420 until the MINIMUM HOP CYCLE TIME is reached in 430. After the MINIMUM HOP CYCLE TIME is reached, the leader station checks (i.e., senses) for a carrier signal at the current frequency of the hop cycle in 450. Note that the leader station itself could be in the process of completing a packet transmission at this time so it would then know that the carrier signal is present in 450. When the carrier is no longer sensed or the MAXIMUM HOP CYCLE TIME is reached, the leader station broadcasts the hop cycle trailer in 460 and then hops to the next frequency in 470 before returning to the top of the flowchart for the next hop cycle, the next frequency being known and dictated by the leader station. The MAXIMUM HOP CYCLE TIME is defined to be the sum of the chosen MINIMUM HOP CYCLE TIME and TMAX, the maximum packet transmission time. Note that after the MAXIMUM HOP CYCLE TIME, the leader station concludes that interference must be causing the carrier signal to still be sensed since after the MAXIMUM HOP CYCLE TIME there should be no packet transmissions occurring from the remote stations that are associated with the leader station.

Figure 6:
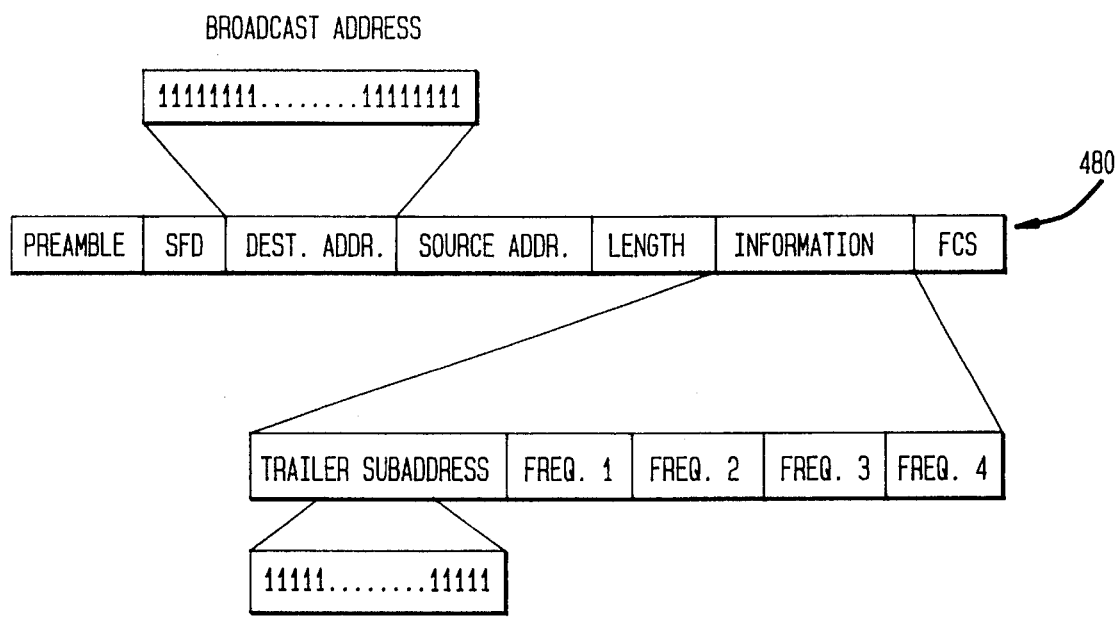
FIGS. 6 and 7 show two alternative formats for a hop cycle trailer.
Figure 7:
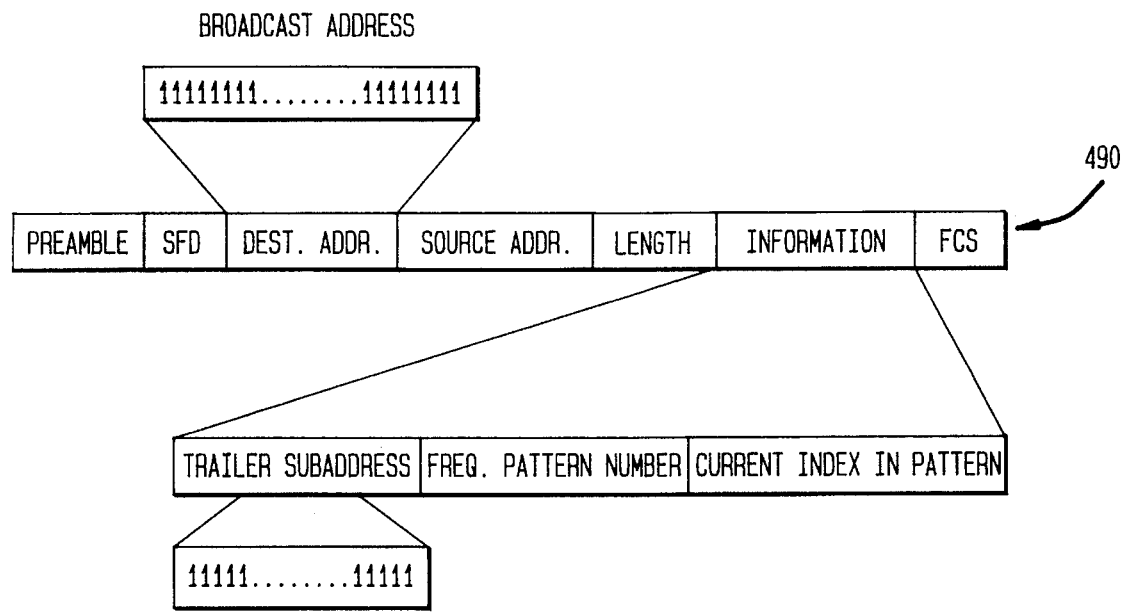

The control information in the hop cycle trailer can take several forms. We describe two classes of mechanisms whereby the leader station can indicate to the remote stations what the next frequency is in the current frequency-hopping sequence. These two mechanisms are illustrated by the two different formats for the hop cycle trailer, 480 and 490, that are shown in FIGS. 6 and 7, respectively. In these figures, all but the information field is the same between the two figures. Those skilled in the art will recognize a standard type of Format to this hop cycle trailer packet. The packet begins with a preamble to aid with radio synchronization. After the preamble, a Start Frame Delimiter (SFD) is included to indicate the beginning of the packet. A broadcast destination address is used for the hop cycle trailer, which is followed by the source address of the leader station. After the addresses, the length of the information field is included, the information field is transmitted, and the packet is ended with the transmission of a Frame Check Sequence (FCS) for error detection. In both FIGS. 6 and 7, a special trailer subaddress is used to indicate that these packets are hop cycle trailers as opposed to a regular data packet.

In the first approach for indicating the next frequency, the leader station includes the next P frequencies of the frequency hopping pattern in the hop cycle trailer 480, where P=4 in the example of FIG. 6. This is a very flexible method since the frequency-hopping pattern is not fixed beyond a time horizon of P frequencies. Thus, the leader station can modify the sequence (e.g., drop an interference-prone frequency) dynamically. This approach is documented in the aforementioned patent application "Radio Communications System with Fault Tolerant Frequency Hopping Synchronization" by Bauchot et al.

In the second approach, which for the hop cycle trailer 490 is shown in FIG. 7, a fixed frequency-hopping pattern is used. This pattern is one of several patterns that are assumed to be known by both the leader and remote stations. Thus, the leader need only indicate the pattern that is being used (i.e., the frequency pattern number) and the current index in the pattern, that is, the index indicating at which point in the given frequency pattern the radio transceiver will next be hopping to.

The preferred embodiment will be discussed by first describing the mechanisms through which a remote station initially acquires the frequency-hopping sequence and achieves timing coordination with the leader station and secondly describing mechanisms for maintaining this frequency and timing synchronism in the face of control information loss due to interference or noise.

Figure 8:
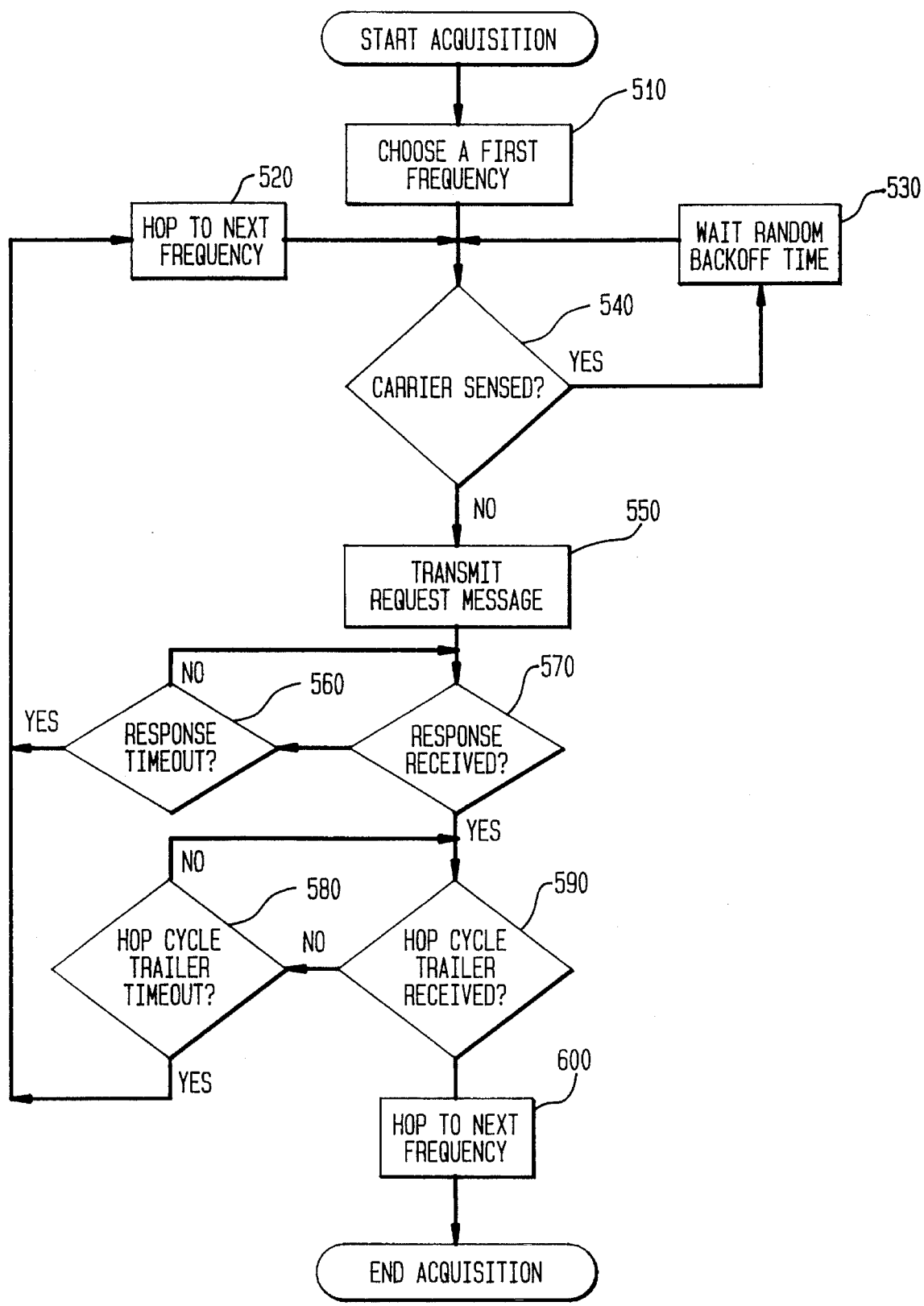
FIG. 8 is a flowchart illustrating the mechanism whereby a remote station achieves frequency acquisition.

We describe a fast acquisition mechanism that uses the radio in an active search mode to find the frequency that a leader station is currently using. This procedure would be used when a user initially turns on his remote station or when he moves from being in range of one leader station to being in range of another as is the case in a cellular architecture with leader stations that are access points. FIG. 8 shows the flowchart that describes the mechanism through which a remote station achieves frequency acquisition with a leader station that is operating according to the flowchart of FIG. 5. In FIG. 8, the remote station initially chooses a first frequency at random in block 510. The remote station then senses for the carrier signal in 540 and if it senses carrier it waits a random backoff time in block 530. The detailed procedure of block 530 was given previously in block 240 of FIG. 3. If a carrier signal is not sensed in 540, the remote station transmits in 550 a request message to any leader station that may be within range. The request message is a packet that indicates to the leader station that a remote station is seeking to acquire its frequency-hopping pattern and hop cycle timing to establish communications with the leader. The remote station then waits for a response from any leader station. If a response is received in 570 before the response timeout, the remote station then, in 580 and 590, leaves its receiver tuned (i.e., listens) on the first frequency and waits to receive a trailer. If a response is not received in 570 before the response timeout of 560, then the remote station hops to a second randomly chosen frequency in block 520 and restarts the sensing procedure. If in 590, a hop cycle trailer is received before the trailer timeout is reached, then in 600 the remote station hops to the next frequency that is indicated in the received hop cycle trailer according to either of the methods described in FIGS. 6 and 7. After block 600 is completed, the remote station enters the normal operation mode that will be described later in FIGS. 9 and 10. If in 580, the hop cycle trailer timeout is reached, the remote station hops to a second randomly chosen frequency in block 520 and restarts the sensing procedure.

The mechanisms for maintaining frequency and timing synchronism will now be described. This will be done in a two step process in which we first describe the operation of the system assuming that no control information is loss, that is, in an interference and noise free environment. In a second step, we will describe our new mechanisms for maintaining frequency and timing synchronism in the face of control information loss.

Figure 9:
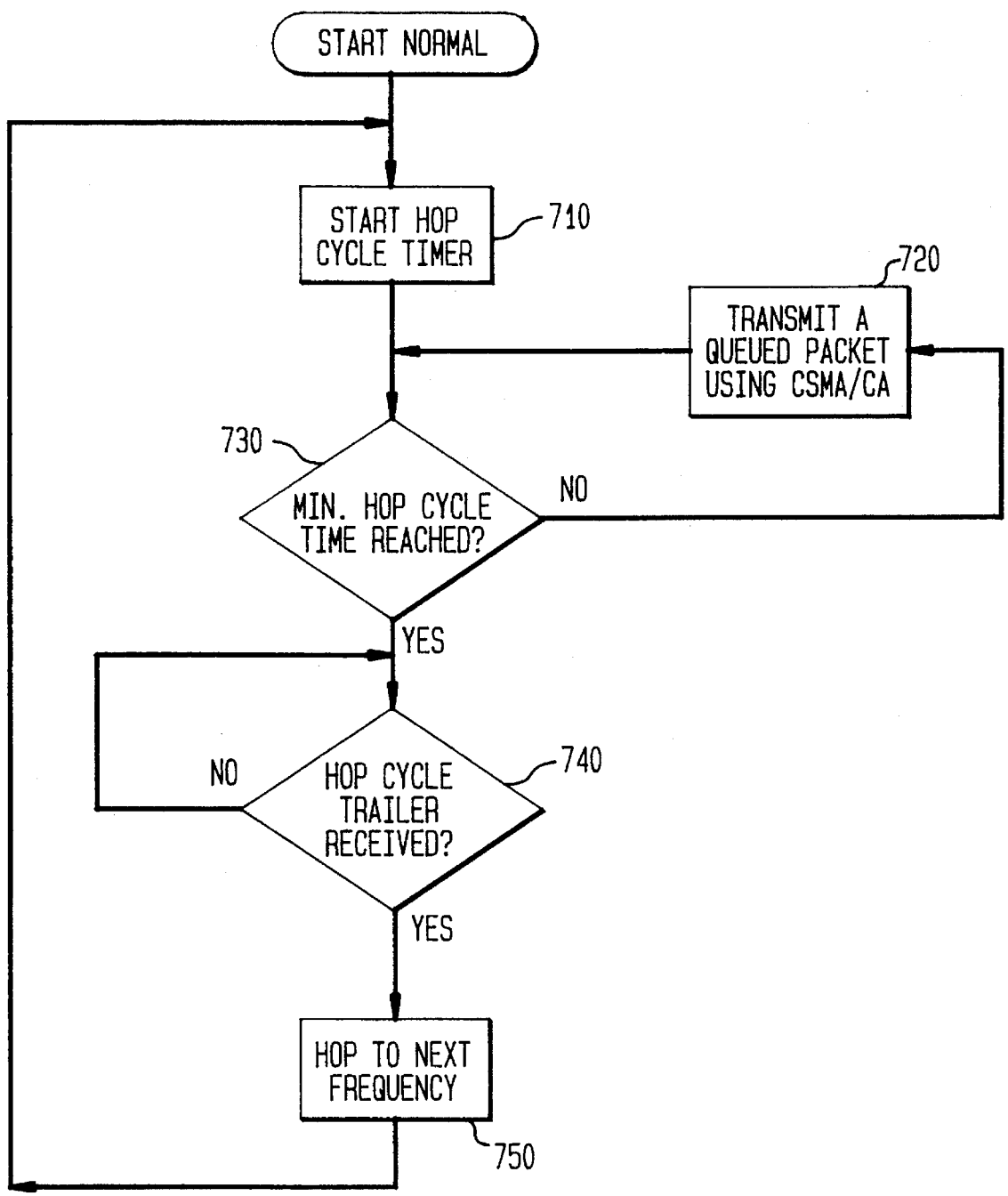
FIG. 9 is a flowchart that is used to explain the operation of a remote station in an interference-free environment.

In a scenario in which hop cycle trailers are never lost, the remote station could follow the operations of FIG. 9 to maintain Frequency-hopping synchronism with the leader station. The top half of FIG. 9 is the same as the top half of FIG. 5 in which the operation of the leader station is shown. With reference to FIG. 9, at the beginning of the hop cycle, the hop cycle timer of the remote station is started in block 710. The remote station is permitted to initiate data packet transmissions in block 720 until the MINIMUM HOP CYCLE TIME is reached in 730. After the MINIMUM HOP CYCLE TIME is reached, the remote station waits to receive the hop cycle trailer in 740. Since we have assumed an interference-free and fading-free environment for this first example, the remote station will successfully receive the hop cycle trailer and then, in 750, hop to the next frequency, which is indicated in the received hop cycle trailer.

Figure 10:
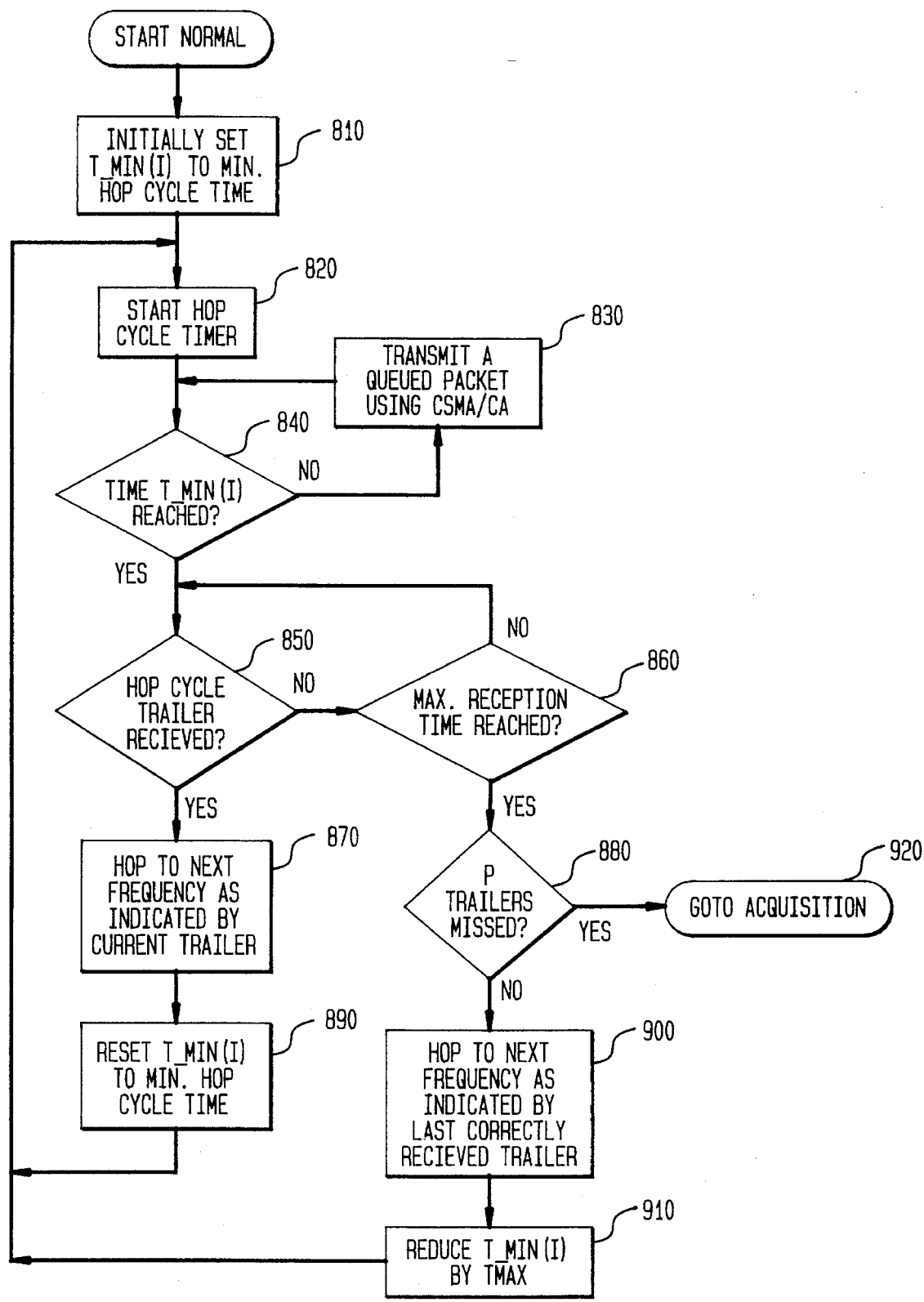
FIG. 10 is a flowchart illustrating the mechanism whereby a remote station maintains frequency synchronization even when hop cycle trailers are lost.

Of course, in the real radio environment, the effects of interference, noise, and multipath-fading can prevent the successful reception of the hop cycle trailer. This possibility of hop trailer loss is considered in the mechanism of FIG. 10. In preparation for our discussion of FIG. 10, we define I to be the index of the remote stations, where I ranges from 1 to N. FIG. 10 is the procedure followed by remote station I, so the local storage variable T_MIN(I) can hold a different value for each remote station. The mechanism of FIG. 10 begins immediately after the acquisition mechanism of FIG. 8 terminates. In 810 of FIG. 10, remote station I initially sets the local variable T_MIN(I) to the MINIMUM HOP CYCLE TIME that was first introduced in our description of FIGS. 4 and 5. If no hop cycle trailers are ever lost, then T_MIN(I) will continue to be equal to the MINIMUM HOP CYCLE TIME so effectively the procedure of FIG. 9 will be followed. With reference to FIG. 10, at the beginning of the hop cycle, the hop cycle timer is started in 820. The remote station I is permitted to initiate data packet transmissions in block 830 until the time T_MIN(I) is reached in 840. After time T_MIN(I) is reached the remote station can complete any packet transmission that may be in progress, but it cannot initiate transmission of a new packet. Note that the time length of this packet transmission is bounded by TMAX, the maximum packet transmission time. After any ongoing packet transmission finishes, the leader station will transmit a hop cycle trailer according to the mechanism of FIG. 5. If the remote station receives this hop cycle trailer in block 850 of FIG. 10, it will hop to the next frequency that is indicated within the currently received hop cycle trailer in 870. Additionally, in block 890, the value of T_MIN(I) will be reset to the MINIMUM HOP CYCLE TIME since T_MIN(I) could possibly have been smaller than the MINIMUM HOP CYCLE TIME if one or more previous hop cycle trailers were not received. After 870 and 890, the remote and leader stations are exactly time and frequency synchronized so the procedure starts over again with a new hop cycle. If in 850, the hop cycle trailer is not received before the MAXIMUM RECEPTION TIME of 860 is reached, then the remote station follows the procedure of 880, 900 and 910 so as to maintain coarse synchronism with the leader station. The MAXIMUM RECEPTION TIME is defined to be sum of the trailer transmission time and the MAXIMUM HOP CYCLE TIME, which was first introduced in the discussion of FIG. 5. Since the MAXIMUM HOP CYCLE TIME was defined to be the sum of TMAX and the MINIMUM HOP CYCLE TIME, the MAXIMUM RECEPTION TIME is simply the sum of the chosen MINIMUM HOP CYCLE TIME, TMAX, and the trailer transmission time. If the remote station does not receive the hop cycle trailer by the MAXIMUM RECEPTION TIME, then the station concludes that it has missed the trailer. After deciding that the hop cycle trailer has been missed in 860, the remote station then checks in 880 to see if it has sufficient information to determine what the next frequency will be in the Frequency-hopping pattern. Two methods of indicating the Forthcoming frequency-hopping sequence were discussed in FIGS. 6 and 7. We assume here that the method of FIG. 6 is being used and that each hop cycle trailer contains a list of the next P frequencies that will be used. If more than P hop cycle trailers have been missed, then the remote station will not know which frequency to use next and consequently will proceed to the acquisition mechanism as indicated by 920. If fewer than P hop cycle trailers have been missed at 880, then the remote station uses the information received in a previously received hop cycle trailer to switch to the next frequency in block 900. Since the remote station does not know precisely when the hop cycle ended because it missed the hop cycle trailer, the remote station assumes that the hop cycle was of length MAXIMUM HOP CYCLE TIME plus the trailer transmission time, but in Fact the hop cycle may only have been of length MINIMUM HOP CYCLE TIME plus the trailer transmission time. To handle this time uncertainty, the value of T_MIN(I) is reduced in 910 by TMAX (i.e., the difference between the MAXIMUM HOP CYCLE TIME and the MINIMUM HOP CYCLE TIME). This action guarantees that the remote station will stop initiating packet transmission in time to hear the next hop cycle trailer. After block 910, the remote station repeats the procedure beginning at block 820. Note that it is assumed that (P−1)×TMAX is less than MINIMUM HOP CYCLE TIME in this discussion so that T_MIN(I) does not become negative. One could additionally check in 880 to see if T_MIN(I) will become negative in 910 and then proceed to the acquisition mechanism if T_MIN(I) is going to become negative.

Having thus described our invention, what we claim as new and desire to secure by Letters Patents is:

1. In a wireless network using frequency-hopping radio communications and having a plurality of remote stations and a leader station which coordinates communications between said remote stations and said leader station, a method of determining a frequency at which each of said remote stations is to initiate communications on a wireless communication link with said leader station and with each other, wherein frequency hopping synchronization is initially established, said method for each one of said remote stations comprising:

a. sensing for a carrier signal at a first frequency by said one remote station;

b. if a carrier signal of said first frequency is sensed, by said one remote station requesting access to said network, transmitting a request message on said first frequency on said wireless communications link, to said leader station after a delay which is determined using a carrier sense protocol, said request message indicating a request to establish communication with said leader station by said one remote station on said wireless communications link;

c. if a carrier signal of said first frequency is not sensed, transmitting said request message on said first frequency on said wireless communications link to said leader station;

d. upon said one remote station's receiving a response from said leader station to said request message, listening on said first frequency for a hop cycle trailer signal on said wireless communications link, said response, if received, indicating that said leader station is currently transmitting and receiving on said first frequency;

e. upon receiving said hop cycle trailer signal by said one remote station, hopping to a second frequency indicated in said hop cycle trailer signal at a time indicated in said hop cycle trailer signal, said second frequency being a frequency on which said one remote station communicates with said leader station and with other of said remote stations; and f. if said response is not received by said one remote station, hopping to a third frequency and repeating steps (a) through (e), replacing said first frequency with said third frequency.

2. In a wireless network using frequency-hopping radio communications and a CSMA protocol, and having a plurality of remote stations and a leader station which coordinates communications on a wireless communications link between said remote stations and said leader station, a method of determining when to hop to a frequency at which said remote stations and said leader station communicate, wherein access to said wireless communications link is obtained using variable length hop cycles, said method comprising:

disabling the initiation of packet transmission by each of said remote stations and said leader station after a selected minimum time following the start of a hop cycle, said hop cycle being a period of time during which a leader or remote station remains on a given frequency for either transmission or reception;

if, after said selected minimum time following the start of said hop cycle, a current carrier frequency is not sensed by said leader station, broadcasting a hop cycle trailer signal from said leader station indicating when said remote stations and said leader station are to hop to a second frequency indicated in said hop cycle trailer signal, said second frequency being a frequency on which each of said remote stations communicates with said leader station and with other of said remote stations;

if, after said selected minimum time following the start of said hop cycle, said current carrier frequency is still sensed by said leader station, then broadcasting said hop cycle trailer signal when said current carrier frequency is no longer sensed;

if, after a maximum time following the start of said hop cycle, said current carrier frequency is still sensed by said leader station, then broadcasting said hop cycle trailer signal where said maximum time is said selected minimum time plus a maximum packet transmission time; and hopping by each of said remote stations to said second frequency in response to said hop cycle trailer signal.

3. In a wireless network using frequency-hopping radio communications and a CSMA protocol, and having a plurality of remote stations $R(1), \ldots, R(I), \ldots, R(N)$ and a leader station which coordinates communications between said remote stations and said leader station, where I is an integer varying from 1 to N, where N is the number of said remote stations, a method of determining when to hop to a frequency at which each of said remote stations and said leader station communicate with each other, wherein access to said wireless communications link is obtained using variable length hop cycles, even upon loss of a hop cycle trailer, said method comprising:

disabling the initiation of packet transmission by each of said remote stations $R(I)$ after a corresponding time $T\_MIN(I)$ following the start of a hop cycle;

disabling the initiation of packet transmission by said leader station after a selected minimum time following the start of a hop cycle;

if, after said selected minimum time following the start of said hop cycle, a current carrier frequency is not sensed by said leader station, broadcasting a hop cycle trailer signal from said leader station indicating when said remote stations and said leader station are to hop to a second frequency indicated in said hop cycle trailer signal, said second frequency being a frequency on which each of said remote stations communicate with said leader station and with other of said remote stations;

if, after said selected minimum time following the start of said hop cycle, said current carrier frequency is still sensed by said leader station, then broadcasting said hop cycle trailer signal when said current carrier frequency is no longer sensed;

if, after a maximum time following the start of said hop cycle, said current carrier frequency is still sensed by said leader station, then broadcasting said hop cycle trailer signal where said maximum time is said selected minimum time plus a maximum packet transmission time;

hopping to said second frequency by each of said remote stations receiving said hop cycle trailer, and resetting said $T\_MIN(I)$ to said selected minimum time by each of said remote stations $R(I)$ receiving said hop cycle trailer signal; and if, after a maximum reception time following the start of said hop cycle, said hop cycle trailer signal is not received by each of said remote stations, hopping by each of said remote stations to a third frequency indicated by a previous hop cycle trailer signal, and for each of said remote stations $R(I)$ reducing $T\_MIN(I)$ by said maximum packet transmission time, said maximum reception time being said maximum time plus the trailer transmission time.

* * * * *